United States Patent [19]

Ohki

[11] Patent Number: 5,313,296

[45] Date of Patent: May 17, 1994

[54] IMAGE INFORMATION PROCESSOR IN WHICH RESIDUAL INFORMATION IS STORED IN A BLANK AREA OF A FIELD MEMORY

[75] Inventor: Mitsuharu Ohki, Tokyo, Japan

[73] Assignee: Sony Corporation, Tokyo, Japan

[21] Appl. No.: 911,396

[22] Filed: Jul. 10, 1992

[30] Foreign Application Priority Data

Jul. 16, 1991 [JP] Japan ............................. 3-175345

[51] Int. Cl.⁵ .................... H04N 1/41; H04N 1/417
[52] U.S. Cl. .................................... 348/208; 348/416
[58] Field of Search ..................... 358/105, 147, 222

[56] References Cited

U.S. PATENT DOCUMENTS

| | | | |
|---|---|---|---|
| 4,636,862 | 1/1987 | Hatori et al. | 358/105 |
| 4,677,476 | 6/1987 | Kondo | 358/105 |
| 4,691,230 | 9/1987 | Kaneko et al. | 358/105 |
| 4,731,651 | 3/1988 | Matsumoto et al. | 358/105 |
| 5,012,270 | 4/1991 | Sekine et al. | 358/222 |
| 5,047,850 | 9/1991 | Ishii et al. | 358/105 |
| 5,063,456 | 11/1991 | Horiuchi et al. | 358/147 |
| 5,099,323 | 3/1992 | Morimura et al. | 358/105 |
| 5,157,732 | 10/1992 | Ishii et al. | 358/105 |
| 5,184,216 | 2/1993 | Kobayashi | 358/105 |

Primary Examiner—Tommy P. Chin
Assistant Examiner—Richard Lee
Attorney, Agent, or Firm—Lewis H. Eslinger; Jay H. Maioli

[57] ABSTRACT

An image information processing apparatus includes a detector for detecting the move vector of an image of the present relative to that of the preceding field; a circuit for processing, on the basis of the move vector, the image of the present field stored in a field memory; and a residual memory for storing the residual information calculated during the period in which the image data of one horizontal scanning line is inputted. The residual information stored in the residual memory is shunted into a blank area of the field memory during a predetermined interval after the period in which the image data is input. The processing circuit performs a wobble correction to correct any shaking of the image between fields or compresses the data quantity of the dynamic image in image transmission, and the information of one entire picture is processed after being divided into a plurality of blocks, whereby the storage capacity of the residual memory can be widely reduced.

6 Claims, 11 Drawing Sheets

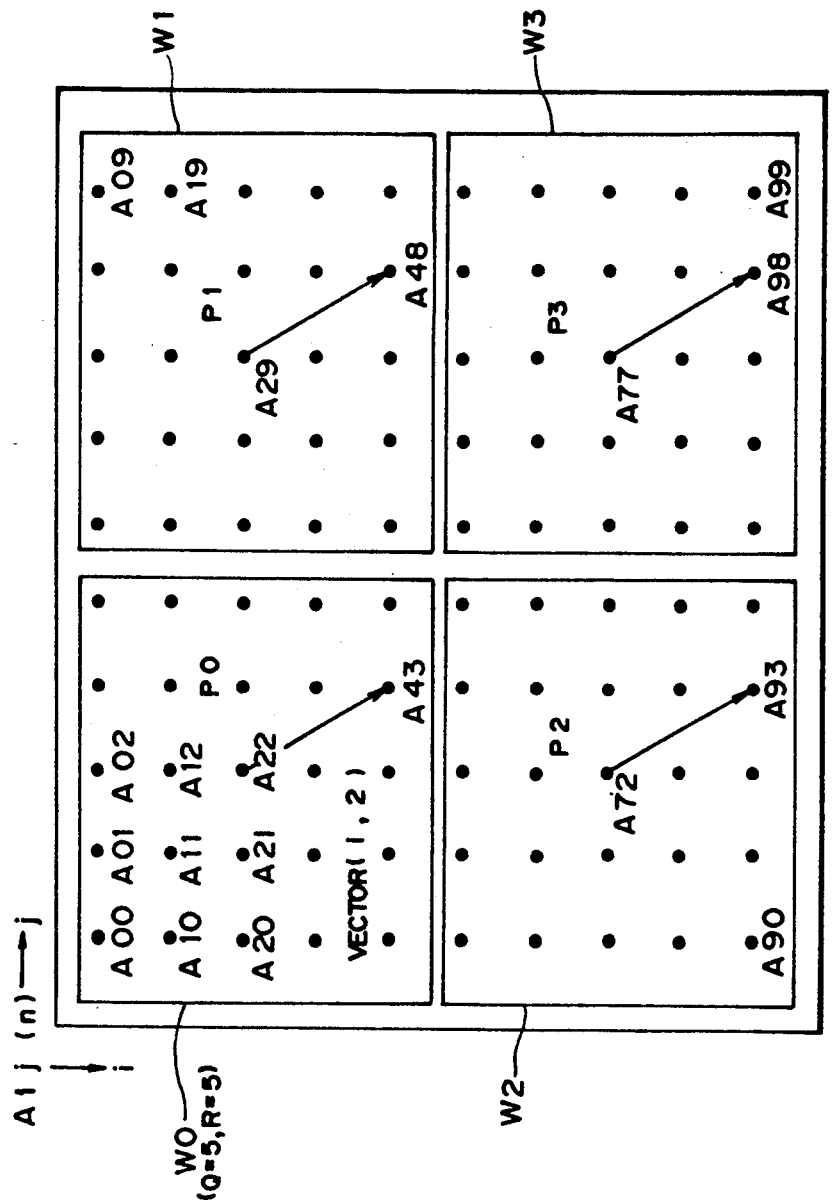

FIG. 4

| LINE NO.1 | INPUT PIXELS / CONTENTS TO RESIDUAL MEMORY 34 | ADDRESS 0 | ADDRESS 1 | ADDRESS 2 | ADDRESS 3 | ADDRESS 4 |
|---|---|---|---|---|---|---|
| 0 | A00~A04 | \|A00-A0(n-1)\| | \|A01-A0(n-1)\| | \|A02-A0(n-1)\| | \|A03-A0(n-1)\| | \|A04-A0(n-1)\| |
|   | A05~A09 | \|A00-A0(n-1)\|<br>+\|A05-A1(n-1)\| | \|A01-A0(n-1)\|<br>+\|A06-A1(n-1)\| | \|A02-A0(n-1)\|<br>+\|A07-A1(n-1)\| | \|A03-A0(n-1)\|<br>+\|A08-A1(n-1)\| | \|A04-A0(n-1)\|<br>+\|A09-A1(n-1)\| |
|   | HORIZONTAL RETRACE INTERVAL | CONTENTS OF RESIDUAL MEMORY 34 ARE SHUNTED TO ADDRESSES 0-4 IN FIELD MEMORY 8 | | | | |
| 1 | A10~A15 | \|A10-A0(n-1)\| | \|A11-A0(n-1)\| | \|A12-A0(n-1)\| | \|A13-A0(n-1)\| | \|A14-A0(n-1)\| |
| --- | --- | --- | --- | --- | --- | --- |
| 5 | A50~A54 | \|A00-A0(n-1)\|<br>+\|A05-A1(n-1)\|<br>+\|A50-A2(n-1)\| | \|A01 A0(n-1)\|<br>+\|A06-A1(n-1)\|<br>+\|A51-A2(n-1)\| | \|A02-A0(n-1)\|<br>+\|A07-A1(n-1)\|<br>+\|A52-A2(n-1)\| | \|A03-A0(n-1)\|<br>+\|A08-A1(n-1)\|<br>+\|A53-A2(n-1)\| | \|A04-A0(n-1)\|<br>+\|A08-A1(n-1)\|<br>+\|A54-A2(n-1)\| |
|   | A55~A59 | S(-2,-2) | S(-1,-2) | S(0,-2) | S(1,-2) | S(2,-2) |
|   | HORIZONTAL RETRACE INTERVAL | CONTENTS OF RESIDUAL MEMORY 34<br>CONTENTS OF ADDRESSES 5-9 IN FIELD MEMORY 8 IN RESIDUAL MEMORY 34 | | CONTENTS OF ADDRESSES 0-4 IN FIELD MEMORY 8, AND CONTENTS OF ADDRESSES 5-9 IN FIELD MEMORY 8 ARE RESTORED AT ADDRESSES 0-4 IN | | |
| --- | --- | --- | --- | --- | --- | --- |
| 9 | A55~A59 | S(-2,2) | S(-1,2) | S(0,2) | S(1,2) | S(2,2) |

↑ T0

IMAGE INFORMATION PROCESSOR IN WHICH RESIDUAL INFORMATION IS STORED IN A BLANK AREA OF A FIELD MEMORY

BACKGROUND OF THE INVENTION

1. Field of the Invention

The present invention relates to an image information processing apparatus such as a camera wobble corrector for correcting the interfield shape of an image in a video camera by detecting the interfield move vector in input dynamic image data, or such as an image compressor for compressing the data quantity of the dynamic image.

2. Description of the Prior Art

In an image information processing apparatus such as a camera wobble corrector for correcting the shake of an image derived from any camera wobbling action or the like in a video shooting operation or a dynamic image compressor for compressing the data quantity to achieve high-efficiency image transmission, it is necessary to execute an accurate calculation of the interfield move vector of the image so as to attain proper wobble correction or efficient data compression.

First a description will be given on a method for detecting the move vector $V(n)$ of the present (n-th) field to the preceding $((n-i)th)$ field $(i=1$ in the following explanation).

FIG. 6 shows an exemplary arrangement where 16 representative points $Pk$ (where $k=0$ to 15) are prepared on one picture to calculate a move vector V. In this example, the pixel data at the points $Pk(n-1)$ in the $(n-1)$th field (hereinafter referred to as representative point data) are denoted by $Ak(n\ 1)$. Within each of search regions $Wk$ in the n th field (where a search origin is denoted by $Pk(n)$, and each region consists of horizontal Q pixels and vertical R pixels), a search is executed for the pixel data $Aij(n)$ of the n-th field corresponding to the representative point data $Ak(n-1)$. More specifically, regarding the vector $(1, m)$ from the search origin Pk to each of the search points $(1, m)$ within the search regions Wk, the residual $S(1, m)$ given by the following equation is calculated.

$$S(1, m) = \sum_{k=6}^{15} |Ak(1, m)(n) - Ak(n - 1)| \quad (1)$$

In the above, $Ak(1, m)(n)$ denote the pixel data of the n-th field at the search point $(1, m)$ in the search region Wk.

With respect to the minimum residual $S(11, ml)$ out of the entire residuals $S(1, m)$ at All the search points, the move vector $V(n)$ of the n-th field to the $(n-1)$th field is expressed as a vector $(11, ml)$.

In addition to the example of FIG. 6 where the move vector V is obtained by calculating the residuals S relative to the entirety of one picture, there may be contrived another example of FIG. 7 where one picture is divided into a plurality of, e.g., four blocks B1, B2, B3, B4, and the move vectors V1, V2, V3, V4 of the individual blocks are detected similarly to the former example of FIG. 6. (Namely, each block is regarded as one entire picture in the foregoing example).

In accordance with a total of the four move vectors V1, V2, V3, V4 detected from the individual blocks, the move vector $V(n)$ of the n-th field is determined on the basis of the following decision reference, for example.

First case: When more than three of the four move vectors are mutually the same, such coincident vectors are regarded as the move vector $V(n)$ of the n-th field.

Second case (any of the cases other than the first one): The move vector $V(n)$ is rendered undetectable, or each block is weighted and the move vector $V(n)$ is determined; or the move vector $Vw$ of the entire picture is detected simultaneously with the four vectors V1, V2, V3, V4 from the individual blocks, and the move vector $Vw$ of the entire picture is adopted as the move vector $V(n)$ of the n-th field.

The above is a method employed when the move vector V3 of the 3rd block B3, for example, is not properly detectable due to some harmful influence from moving objects such as men or vehicles.

FIGS. 8 and 9 are block diagrams showing the constitutions of conventional camera wobble correctors as image information processing apparatus which correspond respectively to FIGS. 6 and 7. The difference between the two apparatus of FIGS. 8 and 9 resides in that the former comprises a residual memory 54 having a storage capacity of $Q \times R$ words, whereas the latter comprises first and second residual memories 64, 65 each having a storage capacity of $Q \times R$ words for the 1st and 2nd blocks B1, B2 or 3rd and 4th blocks B3, B4.

Therefore, a description will be given on the example of FIG. 9 where one picture is divided into a plurality of blocks, and a repeated explanation will be omitted with regard to the example of FIG. 8 included therein.

FIG. 9 is a block diagram of a conventional image information processing apparatus which is a camera wobble corrector having the block arrangement of FIG. 7.

It is assumed here that, prior to the time T0 (shown in FIG. 7), image data $Aij(n-1)$ of the $(n-1)$th field are stored in a field memory 8 via a data bus BU, and representative point data $Ak(n-1)$ out of the image data $Aij(n-1)$ are stored in a representative point memory 2 via the data bus BU.

During the time period T0 to T1, the image data $Aij(n)$ of the n-th field inputted sequentially as an input signal 1 are supplied to a move vector detector 6. Then a subtracter 31 included in the move vector detector 6 calculates the difference between the pixel data at all of the search points in the 1st and 2nd blocks B1, B2 out of the image data $Aij(n)$, and the representative point data $Ak(n-1)$ supplied from the representative point memory 2 via the data bus BU, and the difference thus obtained is processed by an absolute value circuit 32 to have a difference absolute value. Subsequently a cumulation of the difference absolute value, i.e., an intermediate result or a final result of the residual $S(1, m)$, is calculated by an adder 33 and then is stored in 1st and 2nd residual memories 64, 65.

The entire residual $S1(1, m)$ (or its intermediate result) of the 1st block B1 is stored in the 1st residual memory 64, while the entire residual $S2(1, m)$ (or its intermediate result) of the 2nd block B2 is stored in the 2nd residual memory 65. The residuals $S1(1, m)$ and $S2(1, m)$ are calculated as follows.

$$S1(1, m) = \sum_{k=0}^{3} |Ak(1, m)(n) - Ak(n - 1)| \quad (2)$$

$$S2(1, m) = \sum_{k=4}^{7} |Ak(1, m)(n) - Ak(n - 1)|$$

A minimum residual calculator 39 detects the move vector S1 (l11, m11) out of the entire residual S1 (1, m) of the 1st block B1 stored in the 1st residual memory 64 and outputs the detected residual as a move vector V1 (l11, m11) of the 1st block B1.

The circuit configuration may be so modified as to detect the minimum residual S11 (l11, m11), the 2nd minimum residual S12 (l12, m12), the 3rd minimum residual S13 (l13, m13) . . . and so forth, and then to output a plurality of move vectors V11 (l11, m11), V12 (l12, m12), V13 (l13, m13) . . . and so forth as move vectors of the 1st block B1. The same operation may be performed with respect to any block other than the 1st block B1.

At the time T1, the move vector V1 (l11, m11) of the 1st block B1 and the move vector V2 (l21, m21) of the 2nd block B2 are outputted to a controller 7.

During the time period T1 to T2, the move vector V31 (l31, m31) of the 3rd block B3 and the move vector V41 (l41, m41) of the 4th block B4 are detected by the move vector detector 6. The residuals S3 (1, m) and S4 (1, m) stored respectively in the 1st and 2nd residual memories 64, 65 during the time period T1 to T2 are expressed by the following equations.

$$S3(1, m) = \sum_{k=8}^{11} |Ak(1, m)(n) - Ak(n - 1)| \quad (3)$$

$$S4(1, m) = \sum_{k=12}^{15} |Ak(1, m)(n) - Ak(n - 1)|$$

At the time T2 corresponding to termination of the n-th field input, the move vector V(n) of the n-th field to the (n−1)th field is determined by the controller 7 from the move vectors V1, V2, V3, V4 of the blocks B1, B2, B3, B4 on the basis of the decision reference mentioned above. The move vector V(n) thus obtained is added to the cumulative move vector Vt subsequent to the reference field (e.g. 1st field) to thereby produce (Vt(n)=Vt(n−1)+V(n)), and a read address ADR corrected with respect to the cumulative move vector Vt(n) is outputted to a field memory 8.

During the time period T0 to T2, the representative point data Ak(n) out of the image data Aij(n) of the n-th field are stored in the representative point memory 2 simultaneously with detection of the move vectors V1, V2, V3, V4, and the representative point data Ak(n−1) already used are sequentially discarded to update the storage content of the memory. Also during the time period T0 to T2, the image data Aij(n−1) of the (n−1)th field stored in the field memory 8 are sequentially outputted to an interpolator 9 via the data bus BU, and the preceding image data Aij(n−1) already outputted are sequentially replaced with the image data Aij(n) of the n-th field so that the data are updated.

FIG. 10 illustrates an input image area to be stored in the field memory 8 and an output image area to be read out during the time period of the next field.

In FIG. 10, the input image area is composed of a reference-field output image area, and a correction area defined in the periphery of the reference-field output image area in conformity with an estimated maximum move vector. The output image area (denoted by a dotted line) for the reference field or any arbitrary field is slightly smaller than the input image area.

In case the output image area is smaller than an image frame area, it is necessary to magnify the image by interpolating the image data.

FIG. 11(A) is a block diagram of the interpolator 9; FIG. 11(B) is a timing chart of data for explaining the operation of the interpolator 9 in a mode to magnify the image 3/2 times; and FIG. 11(C) shows the result of interpolation.

In FIG. 11(A), the input signal 1 shown in FIG. 9 is inputted sequentially as scanning line data Yi (where i=0, 1, 2, . . . ) during respective horizontal scanning periods H. The input scanning line data Yi is multiplied by a coefficient $C_0$ in a multiplier 91 and then is inputted to an adder 95. And simultaneously therewith, the scanning line data $Y_i$ is inputted also to a 1H delay line 93 via a switch 92 so as to be delayed for the time corresponding to one horizontal scanning period (1H), and the delayed data is multiplied by a coefficient $C_1$ in a multiplier 94 and then is inputted to the adder 95. The outputs of the two multipliers 91 and 94 are added to each other in the adder 95, whereby output scanning line data yi is produced therefrom.

In FIG. 11(B) which shows the operation of line interpolation performed by the interpolator 9 in a 3/2-fold magnification mode, the scanning line data Yi (Y0, Y1, Y2, . . . ) are inputted sequentially as shown, while dummy data DM is inputted during one horizontal scanning period (1H) after input of the scanning line data Y0 or the two scanning line data Y1 and Y2, Y3 and Y4, . . . and so forth.

The switch 92 is selectively changed to a side a during the input period of the scanning line data or to a side b during the input period of the dummy data DM, so that the 1H delay line 93 outputs to the multiplier 94 the delay line data Y0, Y0, Y1, Y2, Y2, Y3, Y4, Y4, . . . and so forth each delayed for the time corresponding to one horizontal scanning period (1H).

The coefficient $C_0$ of the multiplier 91 is so controlled as to become 0, $\frac{2}{3}$ or $\frac{1}{3}$ in synchronism with the horizontal scanning period (H) as shown, while the coefficient $C_1$ of the multiplier 94 is so controlled as to become 1, $\frac{1}{3}$ or $\frac{2}{3}$ similarly thereto, whereby the corrected scanning line data yi given below are outputted from the adder 95 with a delay of 1H.

y0 = Y0 y1 = $\frac{1}{3}$ Y0 + $\frac{2}{3}$ Y1 y2 = $\frac{2}{3}$ Y1 + $\frac{1}{3}$ Y2 y3 = Y2 y4 = $\frac{1}{3}$ Y2 + $\frac{2}{3}$ Y3 y5 = $\frac{2}{3}$ Y3 + $\frac{1}{3}$ Y4 y6 = Y4

In FIG. 11(C), the input scanning line data Yi are denoted by solid lines, and the corrected scanning line data are denoted by dotted lines respectively.

Although horizontal magnification of the image is necessary in addition to vertical magnification, an explanation thereof is omitted here since it is based on the known technique. In FIG. 10, when the output image area is coincident with the image frame, the image magnification described above is not required. However, with reference to the clock signal used for writing the input image area into the field memory 8, the output image area is outputted with insertion of dummy data DM per several lines similarly to the aforementioned, and the dummy data DM is removed by means of a data converter employed in place of the interpolator 9. Consequently, even in this case, there still exists the dummy data delivery time during which no output is supplied from the field memory to the data converter.

In FIG. 9, during the time period T0 to T2(n +1) of the next (n+1)th field, the image data Aij(n) stored in the field memory 8 is sequentially outputted via the data bus BU to the interpolator 9 on the basis of the read address ADR(n) outputted from the controller 7 and, after being interpolated as mentioned, the image data is delivered as an output signal 10.

In the conventional apparatus described above, the operations of writing data in and reading out the same from the field memory 8 are performed in the following manner. The input image data Aij(n) of the n-th field are sequentially written over the area included in the output image area of the (n−1)th field and outputted already to the interpolator 9, and also over the non-outputted area (correction area) in the periphery of the output image area.

In the above conventional example, the number of search points preset in each search region Wk is (Q×R).

In the above conventional apparatus, the residual S (l, m) is calculated with respect to each of the entire search points preset in the search regions Wk of one entire picture or each block, so that each of the residual memories 54, 64, 65 has a storage capacity of (Q×R) words.

In the example where one picture is divided into four blocks (=2×2), the blocks are settable in such a manner that the 1st plus 2nd blocks (B1+B2) are used as a 5th block B5; the 3rd plus 4th blocks (B3+B4) as a 6th block B6; and the 1st plus 2nd plus 3rd plus 4th blocks (=entire picture) as a 7th block B7. Furthermore, a division into 9 blocks (3×3) is also possible in addition to the above division into 4 (2×2). In such a case, it is necessary, according to the conventional apparatus, to provide a certain number a of residual memories each having a storage capacity of Q×R words so as to simultaneously detect move vectors of a blocks (e.g. four blocks B1, B2, B3, B7). Therefore, in an attempt to achieve exact detection of accurate move vectors by increasing the number of representative points or blocks, the capacity of each residual memory is rendered greater to eventually raise a problem that the circuit scale is enlarged.

OBJECT AND SUMMARY OF THE INVENTION

It is an object of the present invention to provide an improved image information processing apparatus which is capable of reducing the storage capacity of each residual memory to Q words from the customary Q×R words by shunting the intermediate result of the residual into a blank area of the field memory during the horizontal retrace interval or the like when the field memory is free from any input or output.

According to one aspect of the present invention, there is provided an image information processing apparatus comprising means for detecting the move vector of an image of the present field relative to that of a preceding field; a circuit for processing, on the basis of the move vector, the image of the present field stored in a field memory; and a residual memory for storing the residual information calculated during the period in which the image data of one horizontal scanning line is inputted; wherein the residual information stored in the residual memory is shunted into a blank area of the field memory during a predetermined interval after the period in which the image data is inputted.

According to another aspect of the present invention, there is provided an image information processing apparatus as defined in the above, wherein the field memory consists of a multiport memory, and the residual information stored in such residual memory is shunted into a blank area of the field memory.

In the above, the residual information mentioned is an intermediate result of the residual, and the processing circuit performs a wobble correction to correct any shaking of the image between fields.

Furthermore, the processing circuit compresses the data quantity of the dynamic image, and the information of one entire picture is processed after being divided into a plurality of blocks.

The above and other features and advantages of the present invention will become apparent from the following description which will be given with reference to the illustrative accompanying drawings.

BRIEF DESCRIPTION OF THE DRAWING

FIG. 3 schematically illustrates an arrangement of representative points and search regions on the picture;

FIG. 4 is a diagram for explaining the operation of the first embodiment;

DESCRIPTION OF THE PREFERRED EMBODIMENTS

Figure 1:
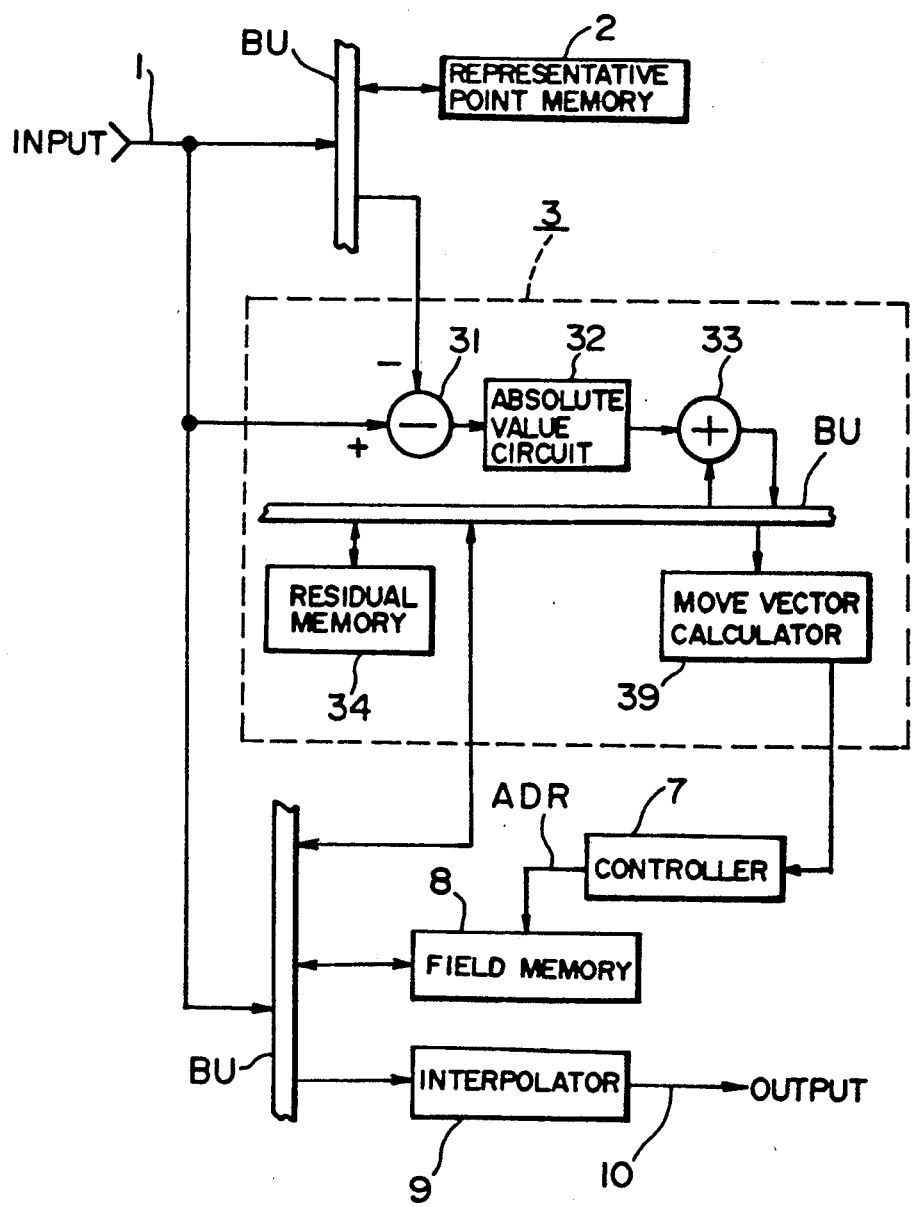
FIG. 1 is a block diagram of a first embodiment representing the image information processing apparatus of the present invention.

Hereinafter a first embodiment of the present invention will be described with reference to FIG. 1.

For the purpose of simplifying the explanation, the number of pixels per field is limited to 100. Namely, pixel data Aij are limited also to 100 (where i=0 to 9, and j=0 to 9). A search region W0 is determined as i=0 to 4 and j=0 to 4; a search region W1 as i=0 to 4 and j=5 to 9; a search region W2 as i=5 to 9 and j=0 to 4; and a search region W3 as i=5 to 9 and j=5 to 9.

Each of the search regions Wk (where k=0 to 5) has a size of Q=5 and R=5. And the residual S (l, m) is calculated with respect to each of 25 vectors where l=−2, −1, 0, 1, 2 and m=−2, −1, 0, 1, 2.

[1] The state at a start time T0(n) in an arbitrary field (n-th field) is as follows.

[1−1] Pixel data Ak(n−1) at representative points Pk in the (n−1)th field are stored in a representative point memory 2.

In this embodiment, pixel data A0(n−1) at representative point P0 is A22(n−1); pixel data A1(n−1) A2(n−1) at representative point P2 is A72(n−1); and pixel data A3(n−1) at representative point P3 is A77 (n−1).

[1−2] A controller 7 is supplied with an input move vector V(n−1) of the (n−1)th field outputted from a move vector detector 3, then updates the cumulative move vector Vt by adding the move vector V(n−1) to the cumulative move vector Vt subsequent to the reference field (e.g. 1st field), and outputs to a field memory 8 a read address ADR corrected by the updated cumulative move vector.

[1-3] In the field memory 8, there are stored pixel data Aij (n 1) of the (n−1)th field.

[2] Now the operation performed during the n-th field will be described below.

[2-1] The operation in the 0th horizontal scanning period is as follows.

[2-1-1] A residual memory 34 having a storage capacity of 5 (=Q) words (addresses 0 to 4) is cleared.

[2-1-2] Pixel data A00 in the search region W0 (k=0) is inputted, and pixel data A0(n−1) at the representative point P0 (k=0) is read out from the representative point memory 2. Then a subtracter 31 and an absolute value circuit 32 calculate a 1st partial term of the residual (−2, −2), i.e., a difference absolute value |A00−A0(n−1)|. An adder 33 reads out an intermediate result (=0) of the residual S (−2, −2) stored at the address 0 in the residual memory 34, then adds the 1st partial term thereto, and stores the result of such addition at the address 0 in the residual memory 34.

With regard to pixel data A01, A02, A03 and A04 of the search region W0 sequentially inputted, the 1st partial terms of the residuals S (−1, −2), S (0, −2), S (1, −2) and S (2, −2) are calculated similarly to the above, and there are added to the 1st partial terms the intermediate result (=0) of the residuals S (−1, −2), S (0, −2), S (1, −2) and S (2, −2) stored respectively at the addresses 1, 2, 3 and 4 in the residual memory 34. The results of such additions thus obtained are sequentially stored at the addresses 1, 2, 3 and 4 in the residual memory 34.

[2-1-3] Pixel data A05 of the search region W1 (k=1) is inputted, while the pixel data A1(n−1) at the representative point P1 (k=1) is read out from the representative point memory 2. Then the subtracter 31 and the absolute value circuit 32 calculate a 2nd partial term of the residual (−2, −2), i.e., a difference absolute value |A05−A1(n−1)|. The adder 33 reads out an intermediate result (=|A00−A0(n−1)|) of the residual S (−2, −2) stored at the address 0 in the residual memory 34, and stores the result of such addition at the address 0 in the residual memory 34.

With regard to pixel data A06, A07, A08 and A09 of the search region W1 sequentially inputted, 2nd partial terms of the residuals S (−1, −2), S (0, −2), S (1, −2) and S (2, −2) are calculated similarly to the above, and there are added to the 2nd partial terms the intermediate results of the residuals S (−1, −2), S (0, −2), S (1, −2) and S (2, −2) stored respectively at the addresses 1, 2, 3 and 4 in the residual memory 34. The results of such additions thus obtained are sequentially stored at the addresses 1, 2, 3 and 4 in the residual memory 34.

[2-1-4] During the horizontal retrace interval from input of the pixel data A09 to input of the pixel data A10, the entire contents of the residual memory 34, i.e., the contents stored at the addresses 0 to 4, are shunted (overwritten) to addresses 0 to 4 of a blank area in the field memory 8 via the data bus BU. Consequently, intermediate results (sums of the 1st and 2nd partial terms) of the residuals S (1, −2), i.e., S (−2, −2), S (−1, −2), S (0, −2), S (1, −2) and S (2, −2) are stored in this order at the addresses 0 to 4 of the blank area in the field memory 8.

[2-2] Also during each of the 1st to 4th horizontal scanning periods (i=1 to 4), the same process as that described in the foregoing [2-1] is executed, and intermediate results (sums of the 1st and 2nd partial terms) of the residuals S (1, −1), S (1, 0), S (1, 1) and S (1, 2) are sequentially stored at addresses 5 to 24 of the blank area in the field memory 8.

[2-3] The operation performed during the 5th horizontal scanning period is as follows.

[2-3-1] The contents at the addresses 0 to 4 of the blank area in the field memory 8 are written (restored) at the addresses 0 to 4 in the residual memory 34 having a storage capacity of 5 (=Q) words.

[2-3-2] Pixel data A50 in the search region W2 (k=2) is inputted, while pixel data A2(n−1) at the representative point P2 (k=2) is read out from the representative point memory 2. Then the subtracter 31 and the absolute value circuit 32 calculate a 3rd partial term of the residual (−2, −2), i.e., a difference absolute value |A50−A2(n−1)|. The adder 33 reads out the intermediate result (|A00−A0(n−1)|+|A05−A1(n−1)|) of the residual S (−2, −2) stored at the address 0 in the residual memory 34, and adds the 3rd partial term thereto. The result of such addition is stored at the address 0 in the residual memory 34.

With regard to each of pixel data A51, A52, A53 and A54 of the search region W2 sequentially inputted, 3rd partial terms of the residuals S (−1, 2), S (0, −2), S (1, −2) and S (2, −2) are calculated similarly to the above, and there are added to the 3rd partial terms the intermediate results of the residuals S (−1, −2), S (0, −2), S (1, −2) and S (2, −2) stored at the addresses 1, 2, 3 and 4 in the residual memory 34. The results of such additions are sequentially stored at the addresses 1, 2, 3 and 4 in the residual memory 34. [2-3-3] Pixel data A55 of the search region W3 (k=3) is inputted, while pixel data A3(n−1) at the representative point P3 (k=3) is read out from the representative point memory 2. Then the subtracter 31 and the absolute value circuit 32 calculate a 4th partial term of the residual (−2, −2), i.e., a difference absolute value |A55−A3(n−1)|. The adder 33 reads out the intermediate result (=|A00−A0(n−1)| +|A05−A1(n−1)|+|A50−A2(n−1)|) of the residual S (−2, −2) stored at the address 0 in the residual memory 34, and adds the 4th partial term thereto. The result of such addition, i.e., the residual S (−2, −2), is stored at the address 0 in the residual memory 34.

With regard to each of pixel data A56, A57, A58 and A59 of the search region W3 sequentially inputted, 4th partial terms of the residuals S (−1, −2), S (0, −2), S (1, −2) and S (2, −2) are calculated similarly to the above, and there are added to the 4th partial terms the intermediate results of the residuals S (−1, −2), S (0, −2), S (1, −2) and S (2, −2) stored at the addresses 1, 2, 3 and 4 in the residual memory 34. And the results of such additions, i.e., the residuals S (−1, −2), S (0, −2), S (1, −2) and S (2, −2) are sequentially stored at the addresses 1, 2, 3 and 4 in the residual memory 34.

[2-3-4] During the horizontal retrace interval from input of the pixel data A59 to input of the pixel data A60, the entire contents of the residual memory 34, i.e., the contents stored at the addresses 0 to 4, are shunted (overwritten) to the addresses 0 to 4 of the blank area in the field memory 8 via the data bus BU. Consequently the residuals S (1, −2), i.e., S (−2, −2), S (−1, −2), S (0, −2), S (1, 2) and S (2, −2) are stored in this order at the addresses 0 to 4 of the blank area in the field memory 8.

[2-4] During each of the 6th to 8th horizontal scanning periods (i=6 to 8), the same process as that described in the foregoing [2-3] is executed, and the residuals S (1, −1), S (1, 0) and S (1, 1) are sequentially stored at addresses 5 to 19 of the blank area in the field memory 8.

Subsequently during the 9th horizontal scanning period (i=9), the residuals S (1, 2) calculated similarly to the above are stored respectively at the addresses 0 to 4 in the residual memory 34.

[2-5] After input of the final pixel data A99 of the n-th field, a minimum residual calculator 39 detects the minimum residual S (11, ml) out of the 20 residuals S (1, m) (where 1=−2 to 2, and m=−2 to 1) stored at the addresses 0 to 19 of the blank area in the field memory 8 and also out of the 5 residuals S (1, 2) stored in the residual memory 34. And a vector (11, ml) relative to such minimum residual is outputted to the controller 7 as a move vector V(n) of the n-th field to the (n−1)th field.

[2-6] Out of the representative point data Ak(n−1) stored in the representative point memory 2, the data used already for calculation of the residual and rendered unnecessary are sequentially replaced with the representative point data Ak(n) included in the input pixel data Aij(n), whereby the stored data are updated.

[2-7] The pixel data Aij(n−1) of the (n−1)th field are outputted from the field memory 8 to the interpolator 9 via the data bus BU in response to the read address ADR(n−1), and simultaneously the pixel data Aij(n−1) of the n-th field inputted sequentially are written over the pixel data Aij(n−1) outputted already and rendered unnecessary.

[2-8] The interpolator 9 interpolates the pixel data Aij(n−1) inputted from the field memory 8 in a manner to magnify the same for filling the image frame, thereby producing an output signal 10 of the (n−1)th field.

The operations described in the foregoing [2-1] through [2-8] are repeatedly performed with respect to the ensuing fields, i.e., (n+1)th field, (n+2)th field and so forth. Therefore, when the present invention is applied to a wobble corrector for a video camera or the like, the real-time wobble correction for any interfield image shake is rendered possible under the improved condition that the storage capacity of the residual memory is reducible from the conventional Q×R words to Q words, i.e. to 1/R. Furthermore, when the present invention is applied to a dynamic image compressor for use in image transmission, real-time image data compression is rendered possible with reduction of the residual memory capacity in the same manner as the above.

Hereinafter a detailed description will be given, with reference to the accompanying drawings, on the first embodiment where the image information processing apparatus of the present invention is applied to a wobble corrector for a video camera or the like.

Figure 8:
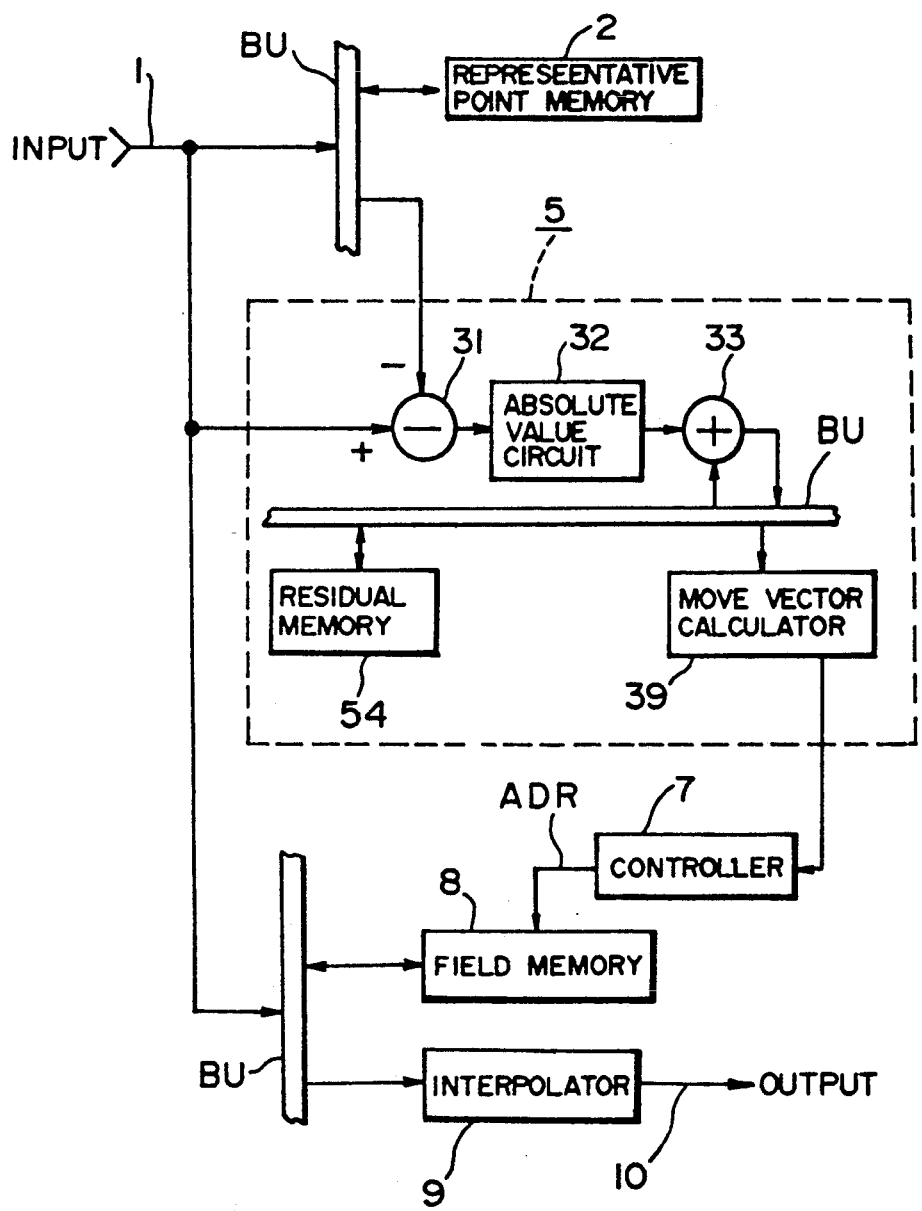
FIG. 8 is a block diagram of a conventional image information processing apparatus.

FIG. 1 is a block diagram of the first embodiment representing the apparatus of the present invention, wherein the aforementioned residual memory 54 (having a storage capacity of Q×R words) of the move vector detector 5 in the conventional example (FIG. 8) is replaced with a residual memory 34 (having a storage capacity of Q words) of a move vector detector 3, and during each horizontal retrace interval, Q residuals or intermediate results thereof stored in the residual memory 34 are shunted via a data bus BU to a blank area of a field memory 8, while the intermediate results of the Q residuals required during the next horizontal scanning period are read out from the blank area of the field memory 8 and are written (restored) in the residual memory 34 via the data bus BU.

Now an explanation will be given first on the blank area of the field memory 8.

It is supposed in this embodiment that dynamic image input data Aij(n) of an arbitrary field (hereinafter referred to as n-th field) are composed of 240,000 words (500 pixels per horizontal scanning line, and 480 scanning lines per field). Since a memory storage capacity in this case is a product obtained by raising 2 to a higher power, the storage capacity of the field memory 8 is selectively set to $2^{18}=262,144$ words. The difference between the two numbers of words is termed a blank area of the field memory 8. In the present invention, the residuals or intermediate results thereof stored in the residual memory 34 are shunted to such blank area not used in the prior art, whereby the storage capacity of the residual memory 34 is reduced to a value corresponding to the residual calculation in one horizontal scanning line, i.e., to Q words.

Figure 2:
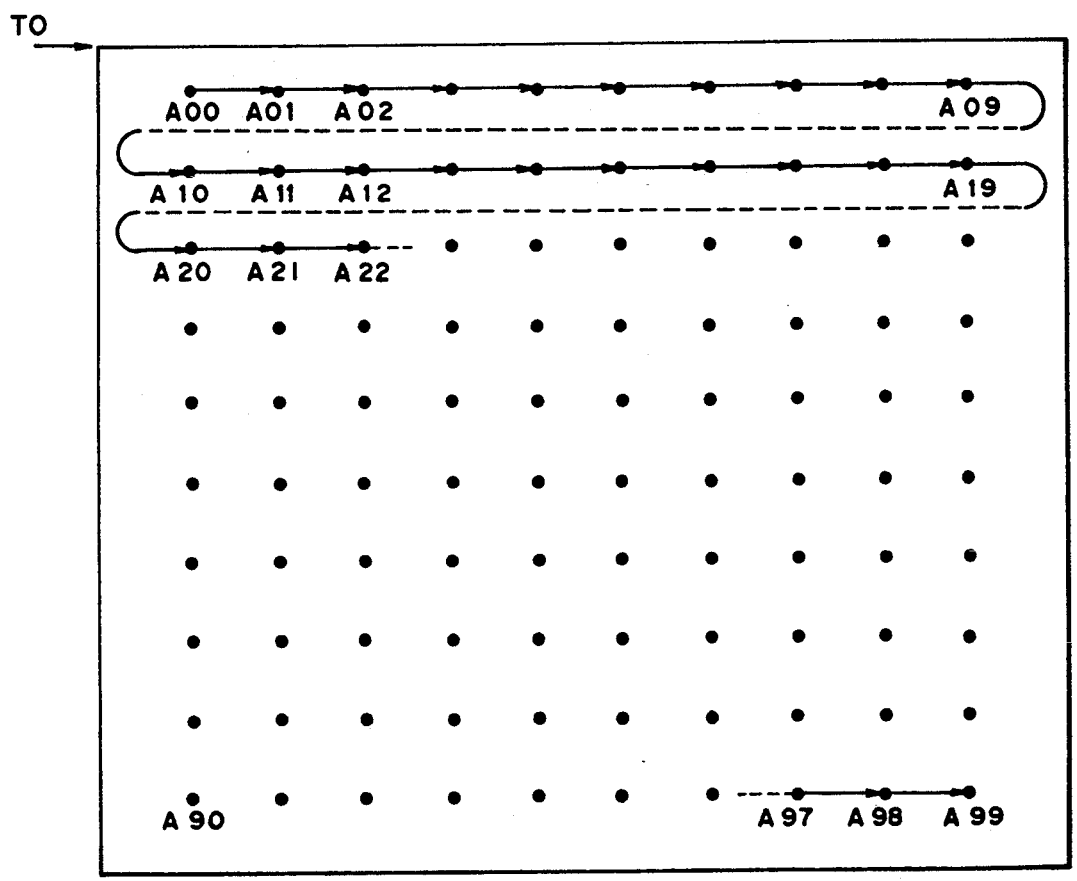
FIG. 2 illustrates an exemplary constitution of pixels on a picture.

In the first embodiment shown in FIG. 1, the following operation is performed. For the purpose of simplifying the explanation, it is assumed here that, as illustrated in FIG. 2, the n-th field is composed of 10 pixels (j=0 to 9) per horizontal scanning line, and 10 scanning lines (j=0 to 9) per field. Namely, pixel data Ai]j(n) are composed of 100 words from A00 to A99. It is also assumed that representative points and move-vector search regions Wk (where k=0 to 3) are set as illustrated in FIG. 3. Namely, a search region W0 includes pixel data Aij (where i=0 to 4, j=0 to 4); a search region W1 includes pixel data Aij (where i=0 to 4, j=5 to 9); a search region W2 includes pixel data Aij (where i=5 to 9, j=0 to 4); and a search region W3 includes pixel data Aij (where i=5 to 9, and j=5 to 9). Therefore the horizontal and vertical sizes of each of the search regions Wk are determined as Q=5 and R=5 respectively; the storage capacity of the residual memory 34 is 5 (=Q) words (addresses 0 to 4); the number of residuals S (1, m) to be calculated is 25(1=−2, −1, 0, 1, 2 and m=−2, −1, 0, 1, 2); and the blank area of the field memory 8 for shunting the residuals S (1, m) or the intermediate results thereof has a capacity of 25 words (addresses 0 to 24).

In FIG. 1, the states of the component circuits at the n-th field start time T0(n) are as follows. Such states are induced when the following operation of each circuit during the n-th field has been performed during the (n−1)th field as well.

[1] Pixel data Ak(n−1) at representative points Pk in the (n−1)th field are stored in a representative point memory 2.

In this example, pixel data $A0(n-1)$ at representative point P0 is $A22(n-1)$; pixel data $A1(n-1)$ at representative point P1 is $A27(n-1)$; pixel data $A2(n-1)$ at representative point P2 is $A72(n-1)$; and pixel data $A3(n-1)$ at representative point P3 is $A77(n-1)$.

[2] A controller 7 is supplied with an input move vector $V(n-1)$ of the $(n-1)$th field outputted from a move vector detector 3, then updates the cumulative move vector Vt by adding the move vector $V(n-1)$ to the cumulative move vector Vt subsequent to the reference field (e.g. 1st field), and outputs to a field memory 8 a read address ADR corrected by the updated cumulative move vector.

[3] In the field memory 8, there are stored pixel data $Aij(n-1)$ of the $(n-1)$th field.

Now the operation performed during the n-th field will be described below.

[1] The operation in the 0th horizontal scanning period is as follows.

[1-1] A residual memory 34 having a storage capacity of (=Q) words (addresses 0 to 4) is cleared.

[1-2] Pixel data A00 in the search region W0 (k=0) is inputted, and pixel data $A0(n-1)$ at the representative point P0 (k=0) is read out from the representative point memory 2. Then a subtracter 31 and an absolute value circuit 32 calculate a 1st partial term of the residual $(-2, -2)$, i.e., a difference absolute value $|A00-A0(n-1)|$. An adder 33 reads out an intermediate result (=0) of the residual S $(-2, -2)$ stored at the address 0 in the residual memory 34, then adds thereto the 1st partial term $|A00-A0(n-1)|$, and stores the result of such addition $(=0+|A00-A0(n-1)|)$ at the address 0 in the residual memory 34.

With regard to pixel data A01, A02, A03 and A04 of the search region W0 sequentially inputted, the 1st partial terms $|A01-A0(n-1)|$, $|A02-A0(n-1)|$, $|A03-A0(n-1)|$, and $|A04-A0(n-1)|$ of the residuals S $(-1, -2)$, S $(0, -2)$, S $(1, -2)$ and S $(2, -2)$ are calculated similarly to the above, and there are added to the 1st partial terms the intermediate results (=0) of the residuals S $(-1, -2)$, S $(0, -2)$, S $(1, -2)$ and S $(2, -2)$ stored respectively at the addresses 1, 2, 3 and 4 in the residual memory 34. Then the results of such additions $|A01-A0(n-1)|$, $|A02-A0(n-1)|$, $|A03-A0(n-1)|$, and $|A04-A0(n-1)|$, are sequentially stored at the addresses 1, 2, 3 and 4 in the residual memory 34.

[1-3] Pixel data A05 of the search region W1 (k=1) is inputted, while the pixel data $A1(n-1)$ at the representative point P1 (k=1) is read out from the representative point memory 2. Then the subtracter 31 and the absolute value circuit 32 calculate a 2nd partial term of the residual $(-2, -2)$, i.e., a difference absolute value $|A05-A1(n-1)|$. The adder 33 reads out an intermediate result $(=|A00-A0(n-1)|)$ of the residual S $(-2, -2)$ stored at the address 0 in the residual memory 34 and, after adding thereto the 2nd partial term $|A05-A1(n-1)|$, stores the result of such addition $(|A00-A0(n-1)|+|A05-A1(n-1)|)$ at the address 0 in the residual memory 34.

With regard to pixel data A06, A07, A08 and A09 of the search region W1 sequentially inputted, 2nd partial terms $|A06-A1(n-1)|$, $|A07-A1(n-1)|$, $|A08-A1(n-1)|$ and $|A09-A1(n-1)|$ of the residuals S $(-1, -2)$, S $(0, -2)$, S $(1, 2)$ and S $(2, -2)$ are calculated similarly to the above, and there are added to such 2nd partial terms the intermediate results $(|A01-A0(n-1)|$, $|A02-A0(n-1)|$, $|A03-A0(n-1)|$ and $|A04-A0(n-1)|)$ of the residuals S $(-1, -2)$, S $(0, -2)$, S $(1, -2)$ and S $(2, -2)$ stored respectively at the addresses 1, 2, 3 and 4 in the residual memory 34. The results of such additions $(|A01-A0(n-1)|+|A06-A1(n-1)|$, $|A02-A0(n-1)|+|A07-A1(n-1)|$, $|A03-A0(n-1)|+|A08-A1(n-1)|$ and $|A04-A0(n-1)|+|A09-A1(n-1)|)$ are sequentially stored at the addresses 1, 2, 3 and 4 in the residual memory 34.

[1-4] During the horizontal retrace interval from input of the pixel data A09 to input of the pixel data A10, the entire contents $(|A01-A0(n-1)|,+|A06-A1(n\ 1)|$, $|A02-A0(n-1)|+|A07-A1(n-1)|$, $|A03-A0(n-1)|+|A08-A1(n-1)|$ and $|A04-A0(n-1)|+|A09-A1(n-1)|)$ of the residual memory 34, i.e., the contents stored at the addresses 0 to 4, are shunted (overwritten) to addresses 0 to 4 of a blank area in the field memory 8 via the data bus BU. Consequently, intermediate results (sums of the 1st and 2nd partial terms) of the residuals S $(1, -2)$, i.e., S $(-2, -2)$, S $(-1, -2)$, S $(0, -2)$, S $(1, -2)$ and S $(2, -2)$ are stored in this order at the addresses 0 to 4 of the blank area in the field memory 8.

[2] Also during each of the 1st to 4th horizontal scanning periods (i=1 to 4), the same process as that described in the foregoing [1] is executed, and intermediate results (sums of the 1st and 2nd partial terms) of the residuals S $(1, -1)$, S $(1, 0)$, S $(1, 1)$ and S $(1, 2)$ are sequentially stored at addresses 5 to 24 of the blank area in the field memory 8.

[3] The operation performed during the 5th horizontal scanning period is as follows.

[3-1] The contents $(|A00-A0(n-1)|+|A05-A1(n-1)|$, $|A01-A0(n-1)|+|A06-A1(n-1)|$, $|A02-A0(n-1)|+|A07-A1(n-1)|$, $|A03-A0(n-1)|+|A08-A1(n-1)|$ and $|A04-A0(n-1)|+|A09-A1(n-1)|)$ at the addresses 0 to 4 of the blank area in the field memory 8 are written (restored) at the addresses 0 to 4 in the residual memory 34 having a storage capacity of 5 (=Q) words. [3-2] Pixel data A50 in the search region W2 (k=2) is inputted, while pixel data $A2(n-1)$ at the representative point P2 (k=2) is read out from the representative point memory 2. Then the subtracter 31 and the absolute value circuit 32 calculate a 3rd partial term of the residual $(-2, -2)$, i.e., a difference absolute value $|A50-A2(n-1)|$. The adder 33 reads out the intermediate result $(|A00-A0(n-1)|+|A05-A1(n-1)|)$ of the residual S $(-2, 2)$ stored at the address 0 in the residual memory 34, and adds the 3rd partial term $|A50-A2(n-1)|$ thereto. The result of such addition $(|A00-A0(n-1)|+|A05-A1(n-1)|+|A50-A2(n-1)|)$ is stored at the address in the residual memory 34.

With regard to each of pixel data A51, A52, A53 and A54 of the search region W2 sequentially inputted, 3rd partial terms $(|A51-A2(n-1)|$, $|A52-A2(n-1)|$, $|A53-A2(n-1)|$ and $|A54-A2(n-1)|)$ of the residuals S $(-1, -2)$, S $(0, -2)$, S $(1, -2)$ and S $(2, -2)$ are calculated similarly to the above, and there are added to such 3rd partial terms the intermediate results $(|A01-A0(n-1)|+|A06-A1(n-1)|$, $|A02-A0(n-1)|$ $|A07-A1(n-1)|$, $|A03-A0(n-1)|+|A08-A1(n-1)|$ and $|A04-A0(n-1)|+|A09-A1(n-1)|)$ of the residuals S $(-1, -2)$, S $(0, -2)$, S $(1, -2)$ and S $(2, -2)$ stored at the addresses 1, 2, 3 and 4 in the residual memory 34. The results of such additions $(|A01-A0(n-1)|+|A06-A1(n-1)|+|A51-A2(n-1)|$, $|A02-A0(n-1)|$, $+|A07-A1(n-1)|$ $+|A52-A2(n-1)|$, $|A03-A0(n-1)|+|A08-A1(n-1)|+|A53-A2(n-1)|$ and $|A04-A0(n-1)|+|A09-A1(n-1)|+|A54-A2(n-1)|$) are sequentially stored at the addresses 1, 2, 3 and 4 in the residual memory 34.

[3-3] Pixel data A55 of the search region W3 (k=3) is inputted, while pixel data A3(n−1) at the representative point P3 (k=3) is read out from the representative point memory 2. Then the subtracter 31 and the absolute value circuit 32 calculate a 4th partial term of the residual (−2, −2), i.e., a difference absolute value $|A55-A3(n-1)|$. The adder 33 reads out the intermediate result ($=|A00-A0(n-1)|+|A05-A1(n-1)|+|A50-A2(n-1)|$) of the residual S (−2, −2) stored at the address 0 in the residual memory 34, and adds the 4th partial term ($|A55-A3(n-1)|$) thereto. The result of such addition, i.e., the residual S (−2, −2) ($=|A00-A0(n-1)|+|A05-A1(n-1)|+|A50-A2(n-1)|+|A55-A3(n-1)|$), is stored at the address 0 in the residual memory 34.

With regard to each of pixel data A56, A57, A58 and A59 of the search region W3 sequentially inputted, 4th partial terms $|A56-A3(n-1)|$, $|A57-A3(n-1)|$, $|A58-A3(n-1)|$ and $|A59-A3(n-1)|$ of the residuals S (−1, 2) , S(0, −2) , S (1, −2) and S (2, −2) are calculated similarly to the above, and there are added to such 4th partial terms the intermediate results ($|A01-A0(n-1)|+|A06-A1(n-1)|+|A51-A2(n-1)|$, $|A02-A0(n-1)|+|A07-A1(n-1)|+|A52-A2(n-1)|$, $|A03-A0(n-1)|+|A08-A1(n-1)|+|A53-A2(n\ 1)|$ and $|A04-A0(n-1)|+|A09-A1(n-1)|+|A54-A2(n-1)|$) of the residuals S (−1, −2), S (0, −2), S (1, −2) and S (2, −2) stored at the addresses 1, 2, 3 and 4 in the residual memory 34. And the results of such additions, i.e., the residuals S (−1, −2), S (0, −2), S (1, −2) and S (2, −2) are sequentially stored at the addresses 1, 2, 3 and 4 in the residual memory 34.

[3-4] During the horizontal retrace interval from input of the pixel data A59 to input of the pixel data A60, the entire contents of the residual memory 34, i.e., the contents stored at the addresses 0 to 4, are shunted (overwritten) to the addresses 0 to 4 of the blank area in the field memory 8 via the data bus BU. Consequently the residuals S (1, −2), i.e., S (−2, −2), S (−1, −2), S(0, 2) and S (1, 2) and S (2, 2) are stored in this order at the addresses 0 to 4 of the blank area in the field memory 8.

[4] During each of the 6th to 8th horizontal scanning periods (i=6 to 8), the same process as that described in the foregoing [3] is executed, and the residuals S (1, −1), S (1, 0) and S (1, 1) are sequentially stored at addresses 5 to 19 of the blank area in the field memory 8.

Subsequently during the 9th horizontal scanning period (i=9), the residuals S (1, 2) calculated similarly to the above are stored respectively at the addresses 0 to 4 in the residual memory 34.

[5] After input of the final pixel data A99 of the n-th field, a minimum residual calculator 39 detects the minimum residual S (11, ml) out of the 20 residuals S (1, m) (where 1=2 to 2, and m=−2 to 1) stored at the addresses 0 to 19 of the blank area in the field memory 8 and also out of the 5 residuals S (1, 2) stored in the residual memory 34. And a vector (11, ml) relative to such minimum residual is outputted to the controller 7 as a move vector V(n) of the n-th field to the (n−1)th field.

[6] Out of the representative point data Ak(n−1) stored in the representative point memory 2, the data used already for calculation of the residual and rendered unnecessary are sequentially replaced with the representative point data Ak(n) (i.e., A0(n)=A22(n), A1(n)=A27(n), A2(n)=A72(n) and A3(n)=A77(n)) included in the input pixel data Aij(n), whereby the stored data are updated.

[7] The pixel data Aij(n−1)th field are outputted from the field memory 8 to the interpolator 9 via the data bus BU in response to the read address ADR(n−1), and simultaneously the pixel data Aij(n−1) of the n-th field inputted sequentially are written over the pixel data Aij(n−1) outputted already and rendered unnecessary.

[8] The interpolator 9 interpolates the pixel data Aij(n−1) inputted from the field memory 8 in a manner to magnify the same for filling the image frame, thereby producing an output signal 10 of the (n−1)th field.

The operations described in the foregoing [1] through [8] are repeatedly performed with respect to the ensuing fields, i.e., (n+1)th field, (n+2)th field and so forth. Therefore, when the present invention is applied to a wobble corrector for a video camera or the like, the real-time wobble correction for any interfield image shake is rendered possible under the improved condition that the storage capacity of the residual memory is reducible from the conventional Q×R words to Q words, i.e., to 1/R. Furthermore, when the present invention is applied to a dynamic image compressor for use in image transmission, real-time image data compression is rendered possible with reduction of the residual memory capacity in the same manner as the above.

FIG. 4 is a diagram for explaining the operation of the move vector detector 3. Since it schematically tabulates the above procedure, a repeated description thereon is omitted here.

Figure 5:
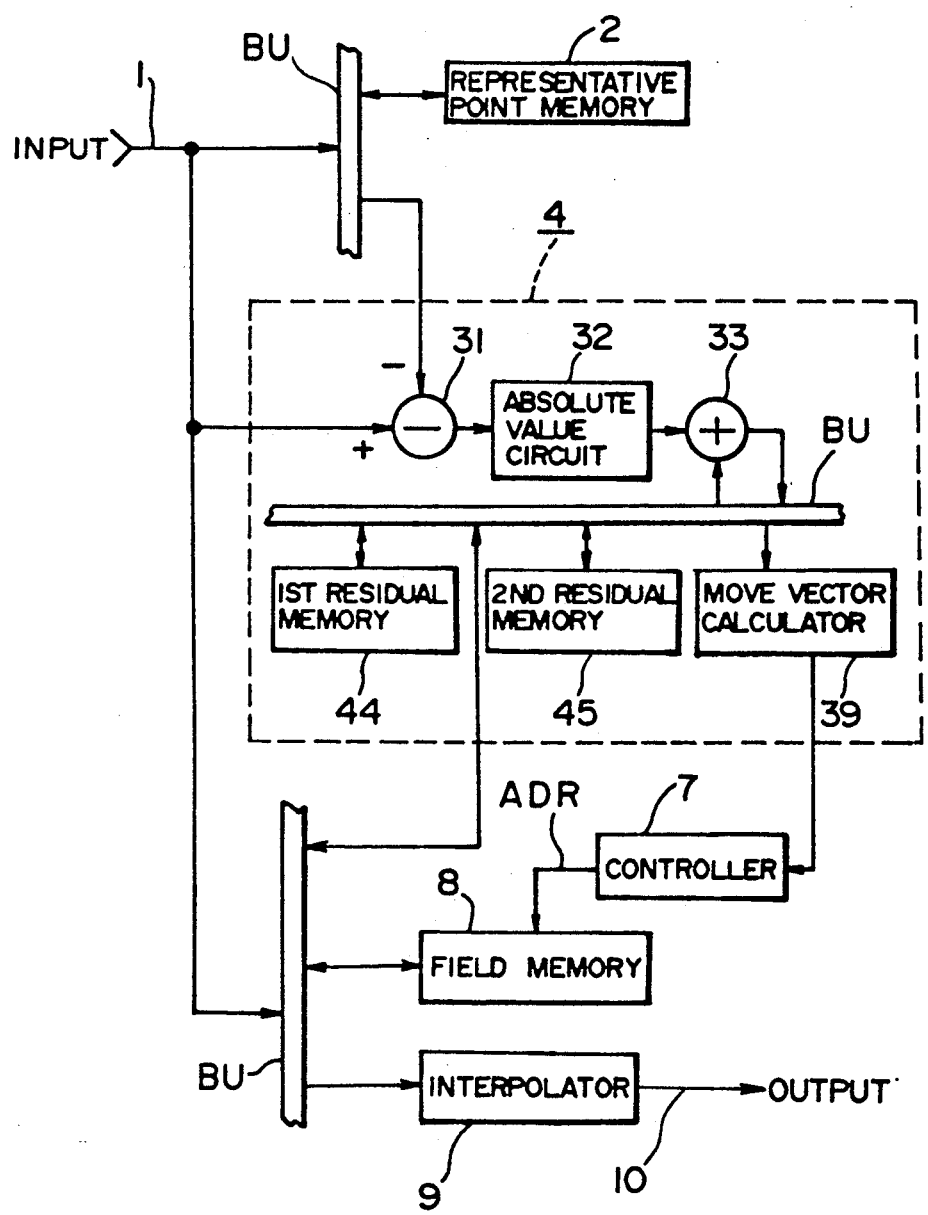
FIG. 5 is a block diagram of a second embodiment representing the apparatus of the present invention.
Figure 6:
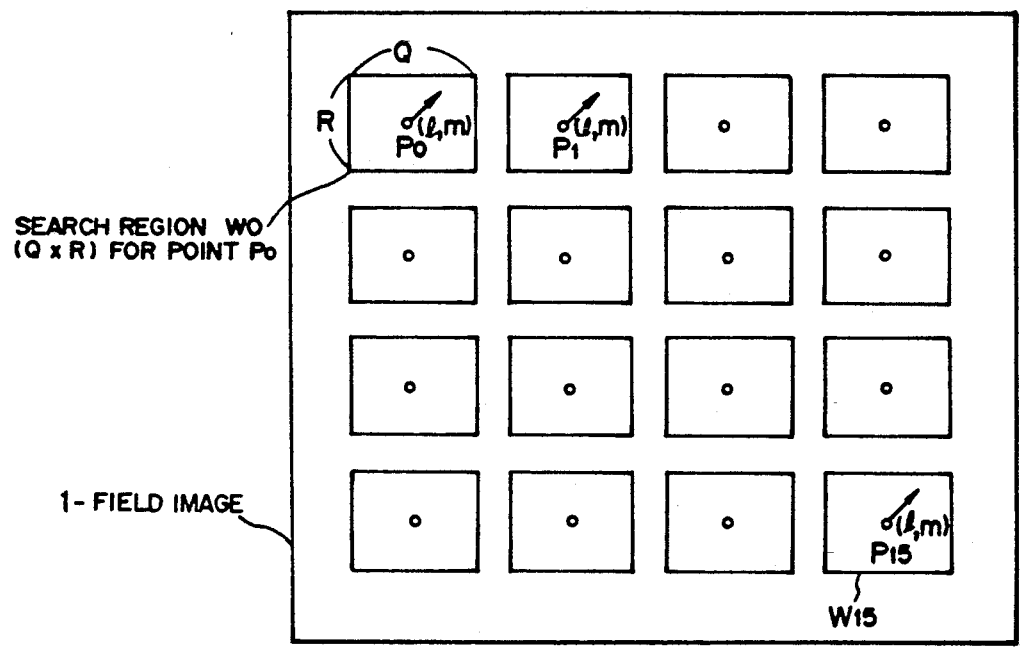
FIG. 6 schematically illustrates an arrangement of representative points and search regions in the second embodiment.
Figure 7:
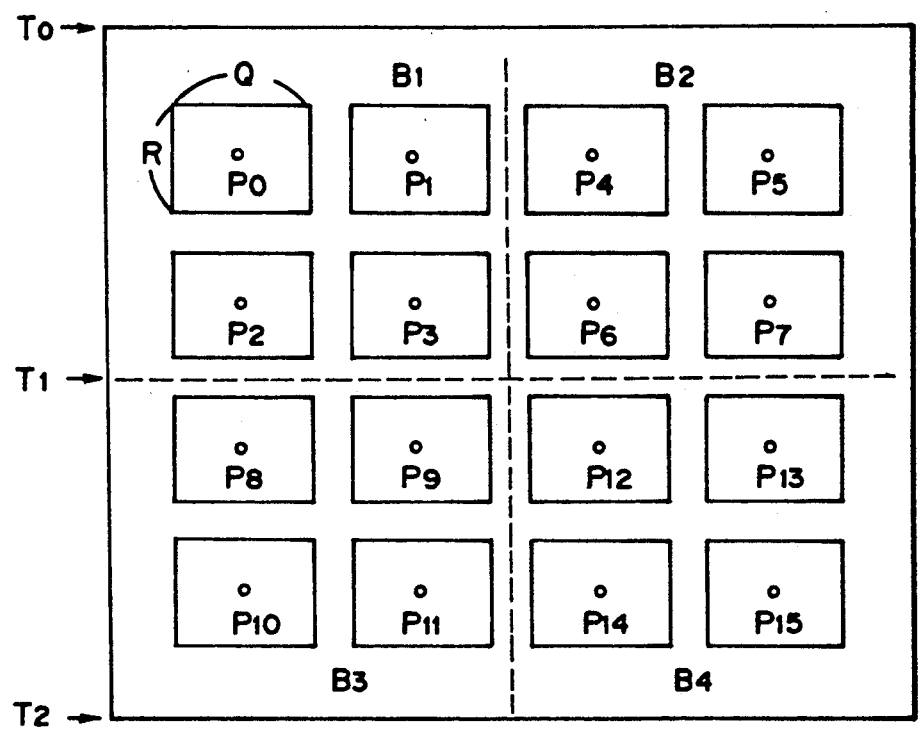
FIG. 7 schematically illustrates an exemplary arrangement of a plurality of blocks.
Figure 9:
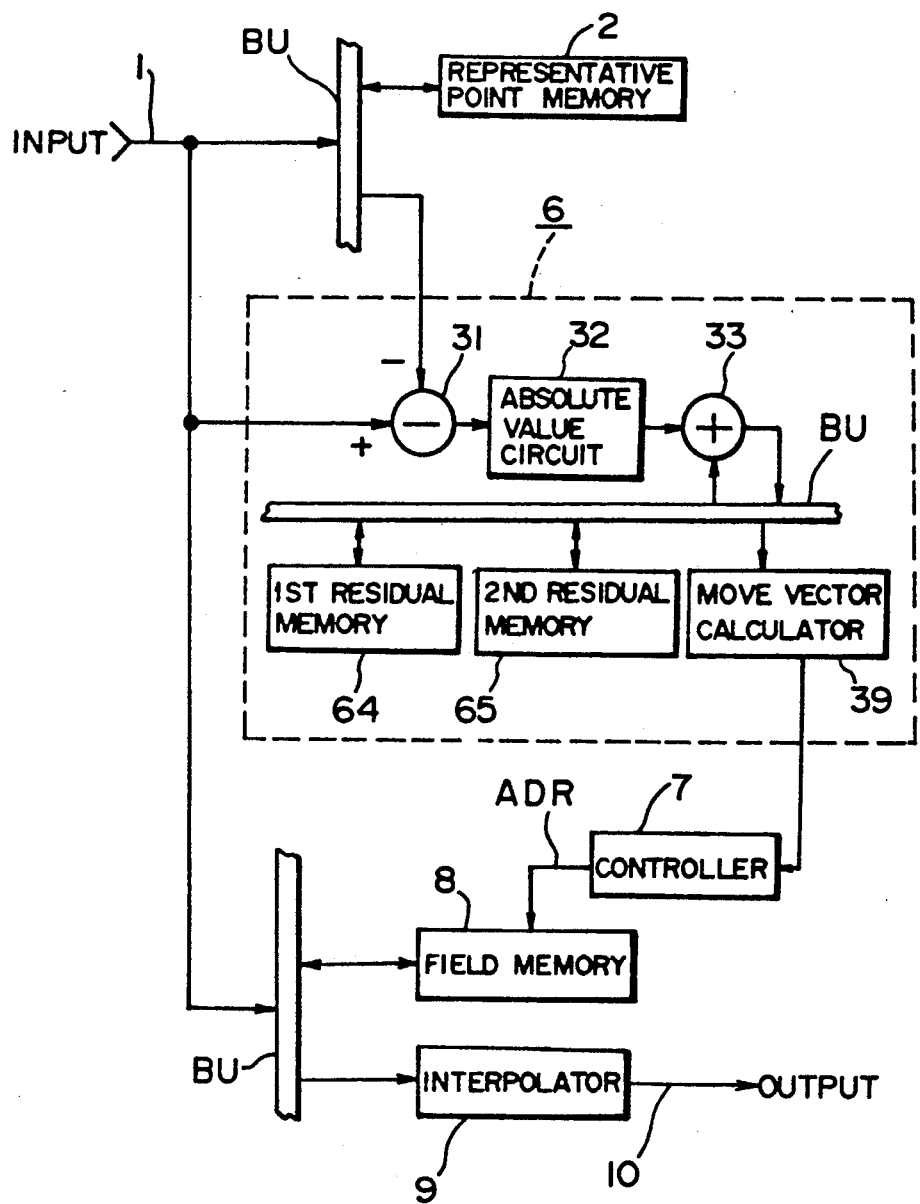
FIG. 9 is a block diagram of another conventional apparatus.
Figure 10:
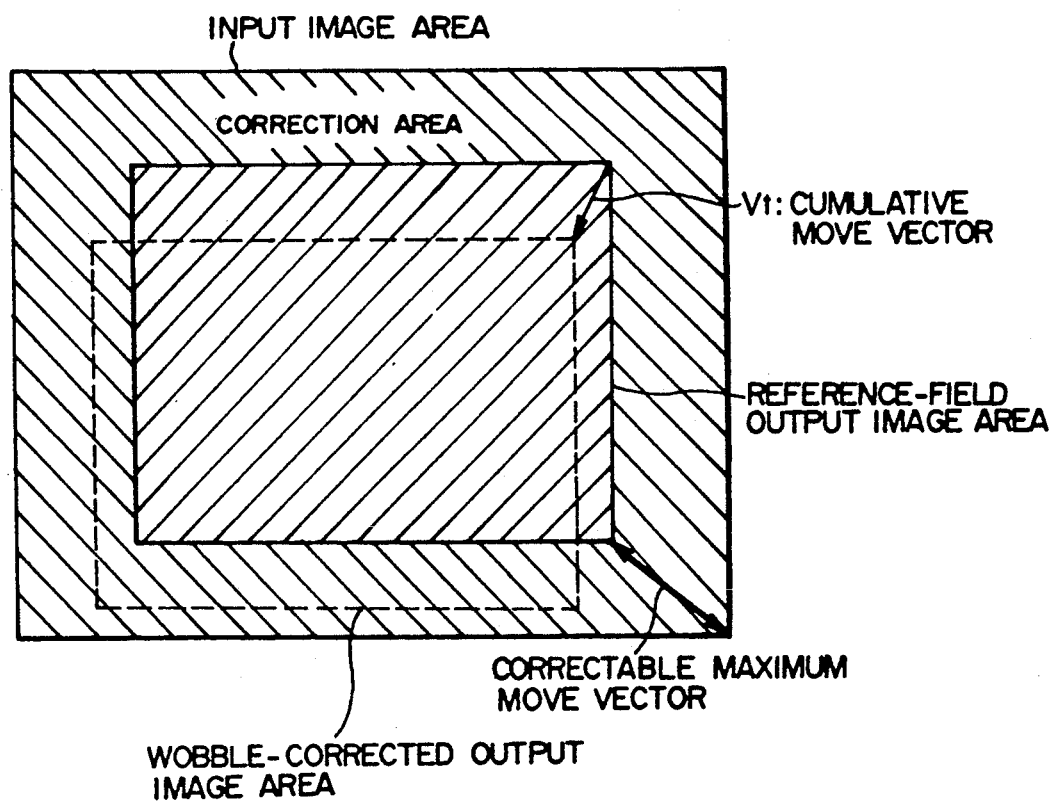
FIG. 10 illustrates input and output image areas.
Figure 11A:
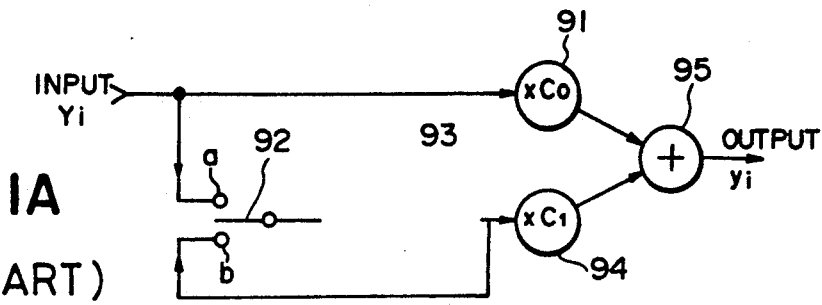
FIGS. 11A to 11C show the circuit configuration of an interpolator and the operation thereof.
Figure 11B:
Figure 11C:
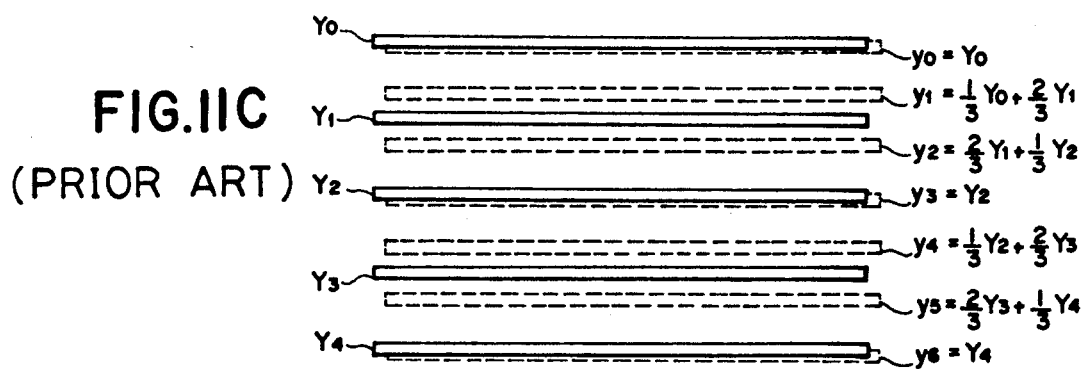

FIG. 5 is a block diagram of a second embodiment of the present invention, wherein the aforementioned first and second residual memories 64, 65 (each having a storage capacity of Q×R words) of the move vector detector 6 in the conventional example (FIG. 9) are replaced with first and second residual memories 44, 45 (each having a storage capacity of Q words) of a move vector detector 4. In this embodiment, the 1st-block or 3rd-block Q residuals or intermediate results thereof in the residual memory 44 and the 2nd-block or 4th-block Q residuals or intermediate results thereof in the residual memory 45 are read out from the residual memories 44 and 45 respectively during one horizontal retrace interval and are shunted to the blank area of the field memory 8 via the data bus BU. And the respective intermediate results of the Q residuals required during the next horizontal scanning period are read out from the blank area of the field memory 8 and are written (restored) in the residual memories 44 and 45 via the data bus BU.

The operation of the first and second residual memories 44, 45 having a reduced storage capacity of Q words is the same as that of the residual memory 34 employed in the aforementioned first embodiment (shown in FIG. 1), and the operation of the move vector detector 4 for detecting the move vector in each block of one entire picture is the same as that of the conventional example (shown in FIG. 9) described in detail. Therefore a repeated explanation relative to FIG. 5 is omitted here.

In the foregoing embodiment, a horizontal retrace interval is utilized as a time period for shunting the data from the residual memory to the field memory and also for restoring the data from the field memory to the residual memory. However, such time period may be the aforementioned dummy data delivery period or a vertical retrace interval as well. It is further to be understood that, when a two-input two-output multiport memory is used as the field memory 8 in the embodiment of the present invention, the operation of shunting or restoring the data may be executed without being limited to any predetermined time period such as the aforesaid horizontal retrace interval, dummy data delivery period or vertical retrace interval.

The above embodiment represents an exemplary case of applying the image information processing apparatus of the present invention to a wobble corrector for a video camera or the like. When the apparatus of the present invention is applied to a dynamic image compressor for compressing the data quantity of a dynamic image in image transmission or the like, real-time image data compression is rendered possible by using a small-capacity residual memory under the conditions that the aforementioned move vector is derived from one entire picture or each of plural blocks thereof and the difference is calculated between the image data shifted by the move vector relative to one entire picture or each block thereof.

In addition to the above embodiment where 4 or 16 representative points are set in a square lattice arrangement, the points may be set in a hexagonal lattice arrangement or the like, and the number of such points may be any other value as well. Furthermore, in the aforementioned detection of a move vector of an arbitrary (n-th) field to the preceding ((n−1)th) field, the difference i between the field numbers is not limited to 1 alone and may be any other value. In case the input signal is composed of digital data and th coordinates of representative points are given by decimal fractions, pixels corresponding thereto are not existent, but representative point data can be obtained by the known technique with interpolation based on adjacent pixels.

According to the present invention, as described hereinabove, residuals or intermediate results thereof calculated with regard to the image data of the preceding horizontal scanning line are shunted from the residual memory to a blank area of the field memory by utilizing a predetermined time period such as a horizontal retrace interval, whereby the storage capacity of the residual memory can be reduced from the conventional Q×R words to Q words.

Consequently, the number of representative points or that of blocks restricted heretofore due to the circuit scale limitation can be widely increased without a disadvantage of enlarging the circuit scale, hence realizing more accurate detection of the move vector. Therefore, when the image information processing apparatus of the present invention is applied to a wobble corrector for a video camera or the like, exact wobble correction can be achieved with certainty. Meanwhile, when the apparatus of the present invention is applied to a dynamic image compressor employed in image transmission, an enhanced efficiency is attainable in executing the real-time process of data quantity compression.

What is claimed is:

1. An image information processing apparatus comprising:
    a field memory for storing a field of image information;
    means for detecting a move vector of an image of a present field of image information relative to that of a preceding field of image information;
    a circuit for processing on the basis of said move vector an image of the present field stored in said field memory; and
    a residual memory storing residual information calculated during a period in which image information of one horizontal scanning lien is input;
    wherein the residual information stored in said residual memory is shunted into a blank area of said field memory during a predetermined interval after a period in which said image information is input.

2. An image information processing apparatus comprising:
    a field memory for storing a field of image information;
    means for detecting a move vector of an image of a present field of image information relative to that of a preceding field of image information;
    a circuit for processing on the basis of said move vector an image of the present field stored in said field memory; and
    a residual memory for storing residual information calculated during a period in which image information of one horizontal scanning line is input;
    wherein said field memory comprises a multiport memory, and the residual information stored in said residual memory is shunted into a blank area of said field memory.

3. The apparatus according to claim 1 or 2, wherein said residual information is an intermediate result of a residual.

4. The apparatus according to claim 1 or 2, wherein said processing circuit performs a wobble correction to correct a shaking of the image between fields.

5. The apparatus according to claim 1 or 2, wherein said processing circuit compresses information quantity of the image.

6. The apparatus according to claim 1 or 2, wherein the image information of one image is processed after being divided into a plurality of blocks.

* * * * *

UNITED STATES PATENT AND TRADEMARK OFFICE
CERTIFICATE OF CORRECTION

PATENT NO. : 5,313,296
DATED : May 17, 1994
INVENTOR(S) : Hitoshi Yoshinobu

It is certified that error appears in the above-identified patent and that said Letters Patent is hereby corrected as shown below:

On the title page, item [57]

In the Abstract, line 3, after "present" insert --field--
Col.1, line 34, change "(n 1)" to --(n-1)--
      line 35, change "n th" to --n-th--
      line 53, change "All" to --all--
Col.2, line 64, change "3 " to --3--

Col.4, line 15, change "$Y_i$" to --Yi--
Col.7, line 5, after "A1(n-1)" insert --at representative point P1 is A27(n-1); pixel data--
      line 18, change "(n1) to --(n-1)--
Col.11, line 21, after "of" insert --5--
      line 65, change "(1,2)" to --(1, -2)--
Col.12, line 13, change "(n1)" to --(n-1)--
      line 40, "[3-2]" should start a new line
      line 48, change "(-2, 2)" to --(-2,-2)--
      line 52, after "address" insert --O--
      line 61, after "A02-A0(n-1)" insert --| + --
Col.13, line 31, change "(n1)" to --(n-1)--

UNITED STATES PATENT AND TRADEMARK OFFICE
CERTIFICATE OF CORRECTION

PATENT NO. : 5,313,296
DATED : May 17, 1994
INVENTOR(S) : Hitoshi Yoshinobu

It is certified that error appears in the above-identified patent and that said Letters Patent is hereby corrected as shown below:

col. 13, line 46, change (0,2) to --(0,-2)--
        same line, change "(2,2)" to --(2,-2)
Col. 14, line 9, after "(n-1)" insert --of the (n-1)--
Col. 15, line 38, change "th" to --the--

<u>In the claims:</u>
Col. 16, line 22, change "lien" to --line--
        line 54, delete "the"

Signed and Sealed this

Twenty-seventh Day of October, 1998

BRUCE LEHMAN

*Attest:*

*Attesting Officer*      *Commissioner of Patents and Trademarks*